June 23, 1942.  E. L. C. WHITE  2,287,334
ELIMINATION OF UNDESIRED ELECTRICAL SIGNALS
Filed May 5, 1939
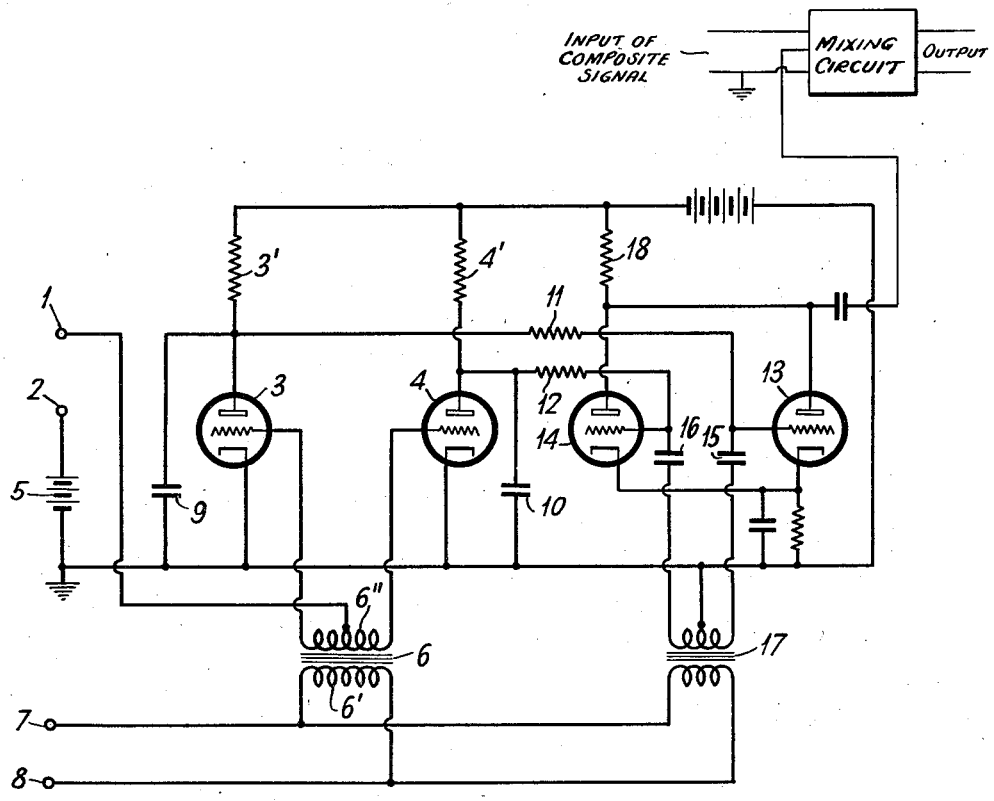
INVENTOR
ERIC LAWRENCE CASLING WHITE
BY *H. S. Grover*
ATTORNEY Patented June 23, 1942

2,287,334

UNITED STATES PATENT OFFICE 2,287,334

ELIMINATION OF UNDESIRED ELECTRICAL SIGNALS

Eric Lawrence Casling White, Middlesex, England, assignor to Electric & Musical Industries Limited, Middlesex, England, a company of Great Britain Application May 5, 1939, Serial No. 271,902
In Great Britain May 17, 1938

7 Claims. (Cl. 250—27)

This invention relates to automatic means for eliminating from a varying recurrent waveform a component waveform of a particular character, but of varying amplitude, and is more particularly concerned with the waveforms occurring in the electrical transmission of pictures.

It is well known that superposed on the picture signals derived from certain types of cathode ray transmitting tubes, there are undesired variations which are mainly of a linear saw-tooth character, though including a smaller curved component, and which occur both at frame and line repetition frequencies, the saw-tooth component being usually referred to as "tilt," and the curved component being known as "bend." Various methods have been proposed for eliminating these undesired components of variation. According to one method, saw-tooth variations are generated separately at frame and line frequency and added in phase in opposition to the signals from the transmitting tube, the correct amplitude of the added signals being attained by suitable adjustment effected manually. One disadvantage of this method lies in the fact that the undesired components are by no means constant, and readjustment is necessary at frequent intervals.

One object of the invention is to provide correcting means which function automatically and so does not require frequent manual adjustment.

According to the invention, there is provided a circuit arrangement for the transmission of a variable recurrent waveform comprising a desired component and an undesired component, wherein a further variable recurrent waveform is generated of shape substantially the same as said undesired component, and is applied together with said first-mentioned variable recurrent waveform in such a manner to rectifying means that the output from said means provides a control potential which is applied so as automatically to vary the amplitude of said second-mentioned variable recurrent waveform so that the second-mentioned variable waveform is caused to substantially eliminate or reduce the undesired component despite variations in amplitude of said component.

The compensating signals, according to the invention, may be added to the signals derived from the cathode ray tube at a point in the transmission sequence either before or after the point where, in effect, the undesired so-called "tilt" signals are measured. The preferred case is the former one, as then a form of negative regeneration is established which reduces the undesired tilt component to any chosen degree.

The mixing and rectification may be performed by simple addition and by means of a square law rectifier, for example, an anode bend rectifier. A linear rectifier may, however, also be used. In this case, if the rectifier is in the form of a peak-rectifier, it is preferable that the direction of increasing brightness should also be that of decreasing potential on the anode of the rectifier so that the output from the rectifier corresponds always to the "black" portions of the picture signals. This arrangement effectively measures the tilt component with reference to the black level and may, in some cases, be preferable to a square law rectifier, in which the output is the measure of the tilt component with respect to the average illumination. Expressed slightly differently, it may be said that the effect of using a square law rectifier is to even up the mean brightness of the right and left halves of the picture, assuming horizontal scanning, while with linear peak rectifiers used as stated, the tendency is to level up the darkest parts of the two sides of the picture.

The mixing and rectification may also be performed by applying the picture signals and the saw-tooth compensating signals respectively to the two control grids of a hexode or of a similar valve.

In any of the above methods the rectification may be performed by means of a balanced push-pull rectifier circuit, the picture signals being applied in the same phase to both rectifiers, and the saw-tooth compensating signals in opposite phases.

A circuit diagram showing such an example of the invention is given in the single figure of the accompanying drawing.

The signals to be corrected are applied to input terminals 1, 2 of which terminal 2 is connected to the cathodes of valves 3, 4 through the battery 5, this battery being adjusted to bias the valves 3, 4 to the bottom bends of their characteristics. Terminal 1 is connected to the centre tap of the secondary winding 6″ of the transformer 6, and the ends of the secondary winding 6″ are connected to the grids of valves 3, 4. The primary winding 6′ of transformer 6 is connected to the terminals 7, 8 to which a steady waveform of the type it is desired to remove from the input signals is applied.

The valves 3, 4 act as anode bend rectifiers, the anode current being greater in that one which has on its grid the undesired waveform component from the input signals and the waveform derived from the terminals 7 and 8 in the same phase. The anodes of valves 3, 4 have large smoothing condensers 9, 10, through which they are connected to their cathodes, and the signals developed across the resistances 3', 4' in the anode circuits of these valves are transferred by the resistances 11, 12 to the grids of valves 13, 14. The valves 13, 14 have the undesired waveform from the terminals, 7, 8 impressed on their grids through condensers 15, 16 in opposite phases by means of transformer 17. If the anode currents of valves 3, 4 are equal, as is the case when no component of the undesired waveform is present in the input signal, then valves 13 and 14 are biased to the same point and their outputs, which are fed in parallel into the resistance 18, balance so that there is no resultant output. An undesired component, however, present in the input signals will unbalance the outputs of valves 3, 4 and hence the biases fed to the grids of valves 13, 14, thereby raising the mutual conductance of one of the valves 13, 14 and lowering the mutual conductance of the other on account of the curvature of these characteristics. It is not necessary to use so-called "variable-mu" valves, but such valves may, of course, be employed. Thus the outputs of valves 13, 14 no longer continue to balance, and a signal of the waveform of the input to terminals 7, 8, either in positive or negative sense is developed across resistance 18, and can be mixed with the signals to be corrected in suitable proportion to cancel substantially the unwanted component.

It will be appreciated that in a push-pull rectifier circuit such as that just described, instead of feeding the picture signals in like phase to both rectifiers and the compensating sawtooth signals in opposite phase, the reverse may be done; namely, the picture signals may be applied in opposite phase and the sawtooth signals in the same phase.

It will be appreciated also that the circuit arrangements described may be used for compensating either the tilt occurring in the scanning of a single line, or that occurring in a whole frame scan, or, of course, both, if two such circuits are used together. Also, it will be appreciated that the invention is not limited in its application to tilt correction, but it may be applied also to so-called "bend" correction, and in fact by generating any suitable assigned compensating waveform the invention may be employed in automatic compensation for undesired signals of the same waveform.

What I claim is:

1. Apparatus for eliminating from a composite wave form an undesired recurrent wave form comprising means for rectifying said composite wave form, means for developing a wave form similar to said undesired wave form, means for impressing said latter developed wave form onto said rectifying means, balanced opposing amplifying means comprising thermionic means having a plurality of anodes, cathode means and at least one control electrode, means for impressing the output of said rectifying means onto the control means of said balanced opposed amplifying means, and means to change the balanced state thereof for impressing the developed wave form similar to the undesired wave form onto control means of said amplifying means.

2. Apparatus in accordance with claim 1 wherein said rectifying means comprise a pair of thermionic rectifiers each having anode, cathode and at least one control electrode, and having the output circuits of said rectifiers connected in phase and having the input circuit thereof connected in parallel for application of the composite signal thereto.

3. Apparatus for eliminating from a composite wave form the undesired wave form contained therein comprising a pair of thermionic rectifiers each having anode, cathode and at least one control electrode, means for biasing the anodes of said rectifying tubes relatively to the cathodes thereof, means for impressing said composite wave form in parallel relationship onto the control electrodes of said rectifying tubes, means for developing a wave form similar to said undesired wave form, means for impressing said latter developed wave form onto the control electrodes of said thermionic rectifying tubes in opposing phase relationship, a pair of thermionic amplifying tubes having anode, cathode and at least one control electrode, means for impressing the output of each of said rectifying tubes onto the control electrode of one of said thermionic amplifying tubes, and means for impressing the developed signal similar to the undesired wave formation in push-pull relationship onto the control electrodes of said thermionic amplifying tubes.

4. Apparatus in accordance with claim 3 wherein biasing means are provided for biasing the grids of said thermionic rectifiers with respect to the cathode thereof.

5. Apparatus in accordance with claim 3 wherein there is provided in addition a time constant circuit connected in the control electrode-cathode circuits of said thermionic amplifying tubes.

6. Apparatus in accordance with claim 1, wherein the means for rectifying the composite wave form comprises square law rectifying means.

7. The method for eliminating from a composite wave form an undesired recurrent wave form, comprising rectifying said recurrent wave form, combining with the composite wave form at the time of rectification a steady wave form substantially of the type desired to be removed from said composite wave form, developing a plurality of independent signals from the rectified combined composite wave form and steady wave form, amplifying the plurality of signals and recombining the amplified signals in opposed relationship while simultaneously combining the steady wave form of the type desired to be removed from said composite signals with the signals during the amplifying step.

ERIC LAWRENCE CASLING WHITE.